United States Patent [19]

Nobumoto et al.

[11] Patent Number: 5,070,960
[45] Date of Patent: Dec. 10, 1991

[54] SLIP CONTROL APPARATUS

[75] Inventors: Kazutoshi Nobumoto; Yutaka Tsukahara, both of Hiroshima, Japan

[73] Assignee: Mazda Motor Corporation, Hiroshima, Japan

[21] Appl. No.: 678,176

[22] Filed: Mar. 29, 1991

Related U.S. Application Data

[63] Continuation of Ser. No. 587,551, Sep. 24, 1990, abandoned, which is a continuation of Ser. No. 374,828, Jul. 3, 1989, abandoned.

[30] Foreign Application Priority Data

Jul. 4, 1988 [JP] Japan ................... 63-166172
Jul. 4, 1988 [JP] Japan ................... 63-166173

[51] Int. Cl.⁵ .................................. B60K 28/16
[52] U.S. Cl. .................. 180/197; 364/426.02
[58] Field of Search ............. 180/197; 364/424.02

[56] References Cited

U.S. PATENT DOCUMENTS

| | | | |
|---|---|---|---|
| 4,554,990 | 11/1985 | Kamiya et al. | 364/426.02 |
| 4,669,046 | 5/1987 | Kubo | 364/426.02 |
| 4,763,912 | 8/1988 | Matsuda | 180/197 |
| 4,771,848 | 9/1988 | Namba et al. | 180/197 |
| 4,779,696 | 10/1988 | Harada et al. | 180/197 |
| 4,811,808 | 3/1989 | Matsumoto et al. | 180/197 |

FOREIGN PATENT DOCUMENTS 31860 2/1988 Japan ............................... 180/197

*Primary Examiner*—Mitchell J. Hill
*Attorney, Agent, or Firm*—Fish & Richardson

[57] ABSTRACT

A slip control apparatus is designed such that an output from the engine is rapidly reduced to a set limit value by a feed-forward control when a friction coefficient on pavement gets large and the engine output reduced to the set limit value is then returned to a set return value larger than the set limit value by the feed-forward control. After returning to the set return value, the engine output is subjected to feed-back control so as to turn a slip value of the driven wheel to a target value. The set limit and return values can be changed in accordance with the friction coefficient on pavement and a vehicle speed. The set limit and return values can be corrected in a direction in which they become larger when the slip value gets larger on account of the upshifting of the transmission.

22 Claims, 11 Drawing Sheets

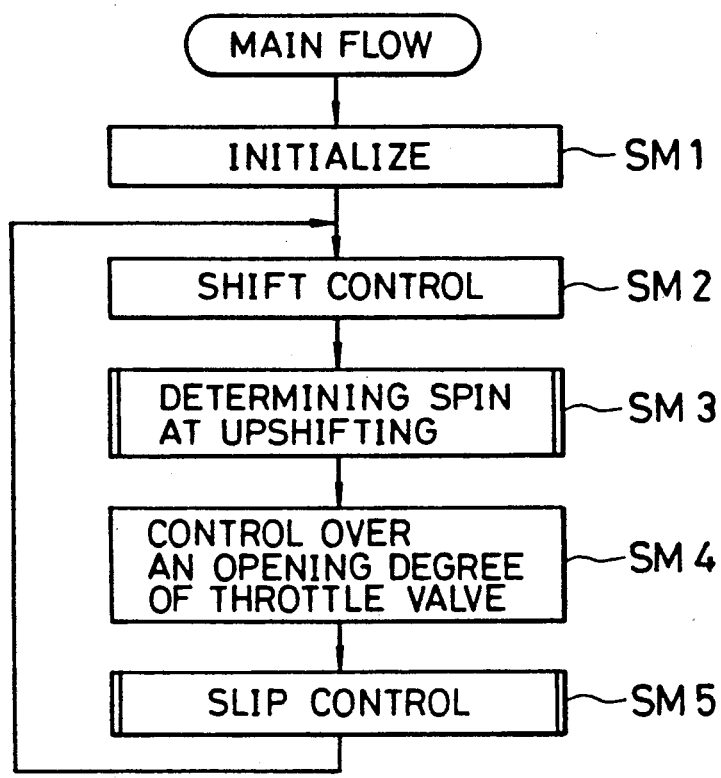
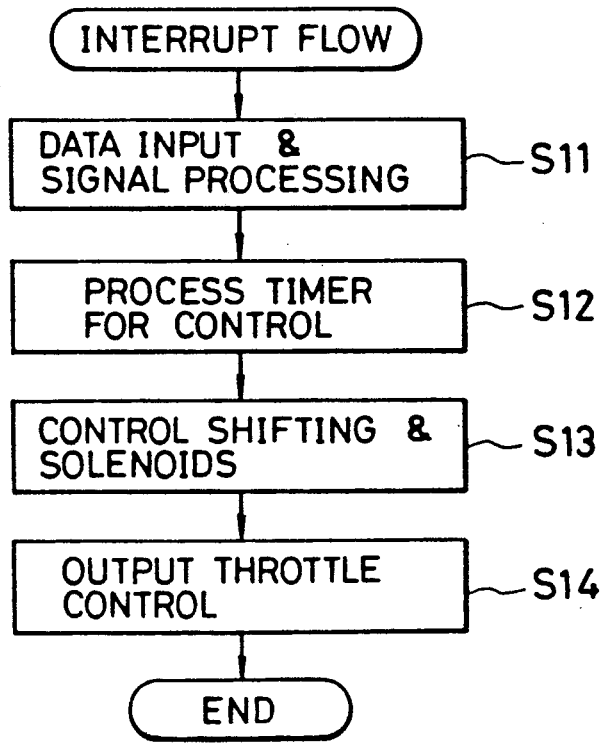

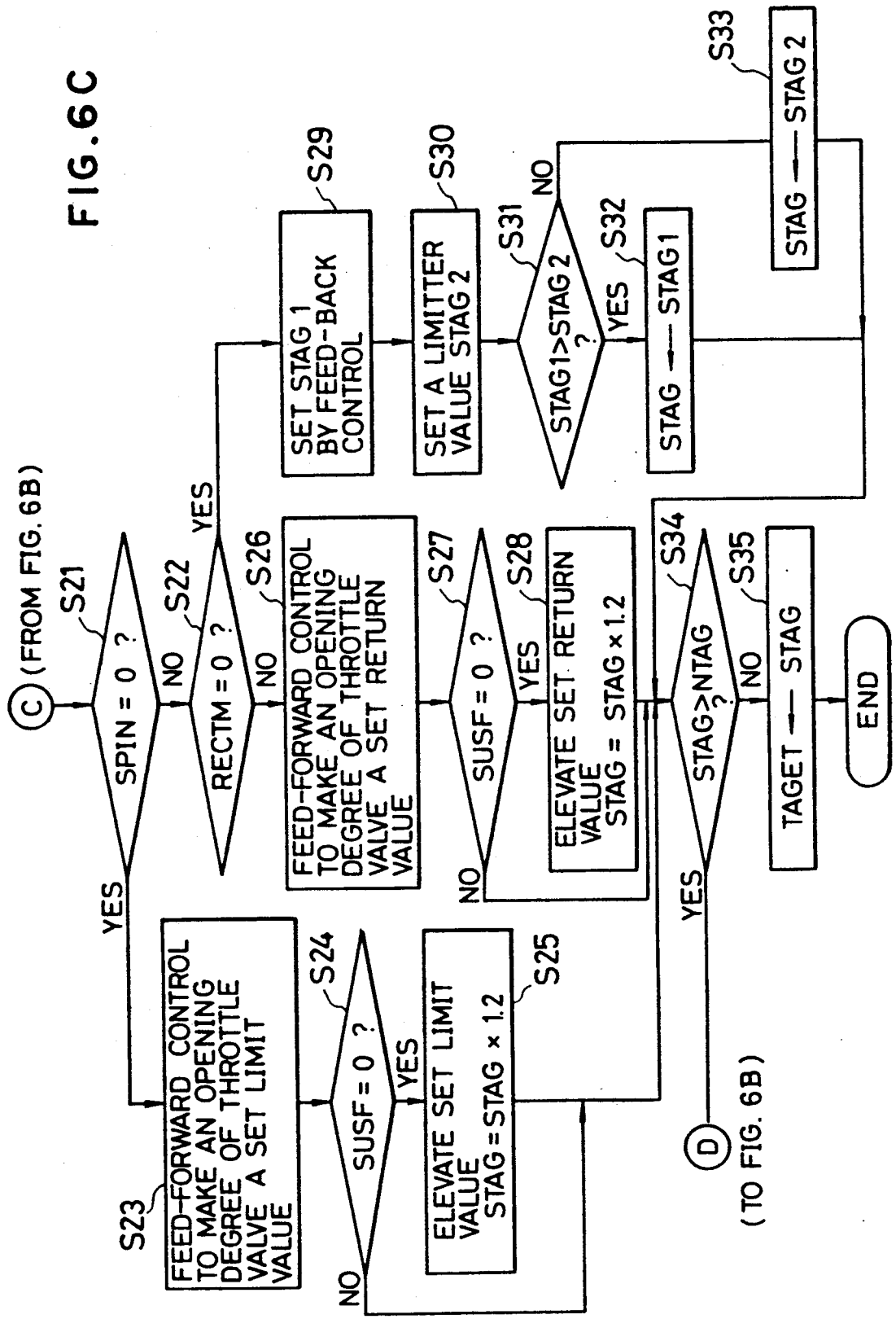

SLIP CONTROL APPARATUS

This application is a continuation of U.S. application Ser. No. 07/587,551, filed Sept. 24, 1990, now abandoned, which is a continuation of U.S. Ser. No. 07/374,828, filed July 3, 1989, now abandoned.

BACKGROUND OF THE INVENTION

1. Field of the Invention

The present invention relates to a slip control apparatus and, more particularly, to an improvement in a slip control apparatus for a vehicle adapted to prevent a slip of the driven wheels with an improved stability in running.

2. Description of Related Art

Japanese Patent Publication (laid-open) No. 182,434/-1986, for example, discloses a slip control apparatus for a vehicle, as an automobile, which is designed such that a difference between velocities of the driven and undriven wheels of the vehicle is detected and the difference is adjusted so as to become a given value by subjecting output of an engine to feed-back control by means of a control over an opening degree of the throttle valve of the engine in order to adjust a velocity of the driven wheels, thus permitting an effective prevention of a slip of the driven wheels and improving a stability of running.

Other examples of subjecting the slip control of the vehicle to feed-back control are disclosed, for example, in U.S. Pat. No. 4,762,196 (counterpart of European Patent Application No. 87-110.079.8). U.S. Pat. No. 4,779,696 (counterpart of W. German Patent Application No. P 37 24 575.9), and U.S. Pat. Application Ser. No. 76,172 (counterpart of W. German Patent Application No. P 37 24 574.0).

The slip control apparatuses as have been described hereinabove are of the type in which output of the engine is subjected to the feed-back control to prevent a slip of the driven wheels so that, as a large degree of slip occurs, a reduction in the output from the engine is delayed requiring a longer time for regulating rotations of the driven wheels. Thus, there is a room for improvement in a rapid convergence of slip.

In order to solve the problems with a convergence of slip, it is considered that a feed-forward control is adopted in an initial stage of slip of the driven wheel in order to shorten a time required for a reduction in the engine output thus facilitating a convergence of slip in a shorter time. It is to be noted, however, that, if the feed-forward control is executed so as to reduce the engine output, a favorable convergence of slip of the driven wheels can be achieved so that, when the feed-back control starts thereafter, a convergence of the velocity of the driven wheel to a target value is delayed because the engine output is low, thus reducing a return responsiveness and providing no favorable acceleration.

SUMMARY OF THE INVENTION

Therefore, the present invention has the object to provide a slip control apparatus of a vehicle, which is adapted to rapidly converge a large degree of slip while ensuring a sufficient acceleration, i.e., driving force, after convergence of the slip.

In order to achieve the above object, the present invention consists of a slip control apparatus, as is basically illustrated as a block diagram in FIG. 1, which comprises:

an output adjusting means for adjusting output from an engine;

a slip value detecting means for detecting a slip value of a driven wheel on pavement;

a reduction control means for subjecting said output adjusting means to feed-forward control to reduce the output from the engine to a set limit value when the slip value detected by said slip value detecting means is equal to or larger than a given value: and a return control means for subjecting said output adjusting means to feed-forward control to return the output from the engine reduced by said reduction control means to a set return value in a given period of time after the output has been reduced by said reduction control means;

wherein said set limit value and said set return value are set in advance at least in accordance with a friction coefficient on pavement and a vehicle speed.

If target amounts to be reduced and to be returned are primarily set at fixed values when feed-forward control is executed to reduce or return the output from the engine to the target amounts, there may be opportunities when a slip cannot be regulated to a sufficient extent in case of some state of road surfaces or a vehicle speed. A slip may be converged in a short time when the vehicle is running on pavement, for example, if a driving force of the wheels would be reduced to a relatively small extent. However, if the vehicle is running on a road surface covered with snow or on an iced road, a slip cannot be converged in a manner as on pavement, unless the driving force be reduced to almost zero. It is also to be noted that a slip is lesser likely to occur during running at high speeds than at low speeds because a resistance of the wheels to pavement during running is high and a driving torque is generally small enough at higher gear stages. Accordingly, the present invention is designed such that target values of the engine output to be reduced and returned by means of the feed-forward control can be variably set in accordance with a friction coefficient on pavement and a vehicle speed.

It is further to be noted that, as the transmission is upshifted, an energy of inertia of the engine is discharged in the course of switching a passage of transmitting its power so that a slip of the driven wheels may be temporarily caused to occur. However, this slip converges automatically as the energy of inertia has been fully discharged. Accordingly, if the output from the engine would be reduced or returned in the same manner as when a slip occurs in other instances where a large amount of a driving force acts, a degree of the output reduced may become so large that deceleration is felt as if it occurs to a great extent. It is thus preferred that, as a slip occurs on account of the upshifting of the transmission, a target value to be reduced or returned by means of the feed-forward control is corrected toward the side on which the engine output increases.

On top of that, it is preferred that a slip control is executed by means of a feed-back control in a usual manner after the execution of the feed-forward control by the return control means because the slip control by means of the feed-back control can converge a slip value or the driven wheels to a target value in a stable manner. Furthermore, it is possible to execute the feed-back control without execution of the feed-forward control by means of both the reduction control means and the return control means if a requirement for a rapid convergence of slip is not the big issue because of a relatively small degree of slip incurred at the driven wheels.

It is noted herein that a slip value of the driven wheel referred to in the specification can be detected as a deviation or a ratio of a rotational velocity of the driven wheel to that of the undriven wheel.

It is to be understood as a matter of course that the slip control can be executed by applying a braking force to the driven wheels as well as reducing the output from the engine.

Other objects, features and advantages of the present invention will become apparent in the course of the description of the preferred embodiments which follows, in light of the accompanying drawings.

BRIEF DESCRIPTION OF THE DRAWINGS

FIGS. 3 to 8 each is a flow chart showing a control example of the present invention.

DESCRIPTION OF THE PREFERRED EMBODIMENTS

The present invention will be described more in detail with reference to the accompanying drawings.

Figure 1:
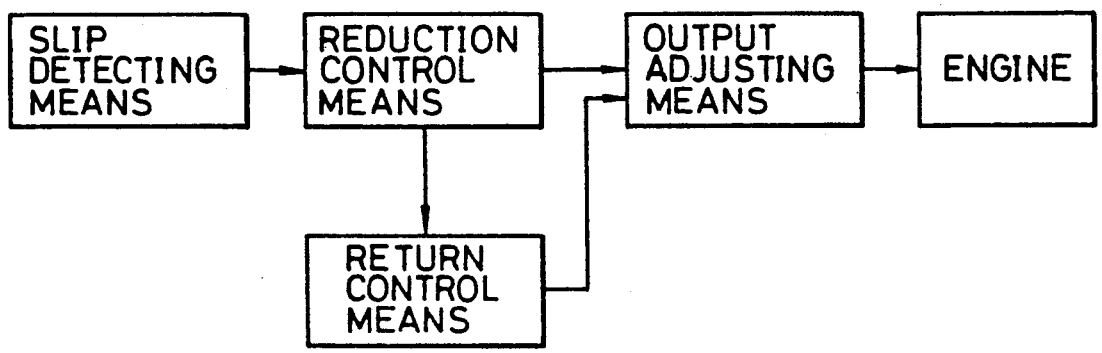
FIG. 1 is a block diagram showing the construction of the slip control apparatus according to the present invention.
Figure 2:
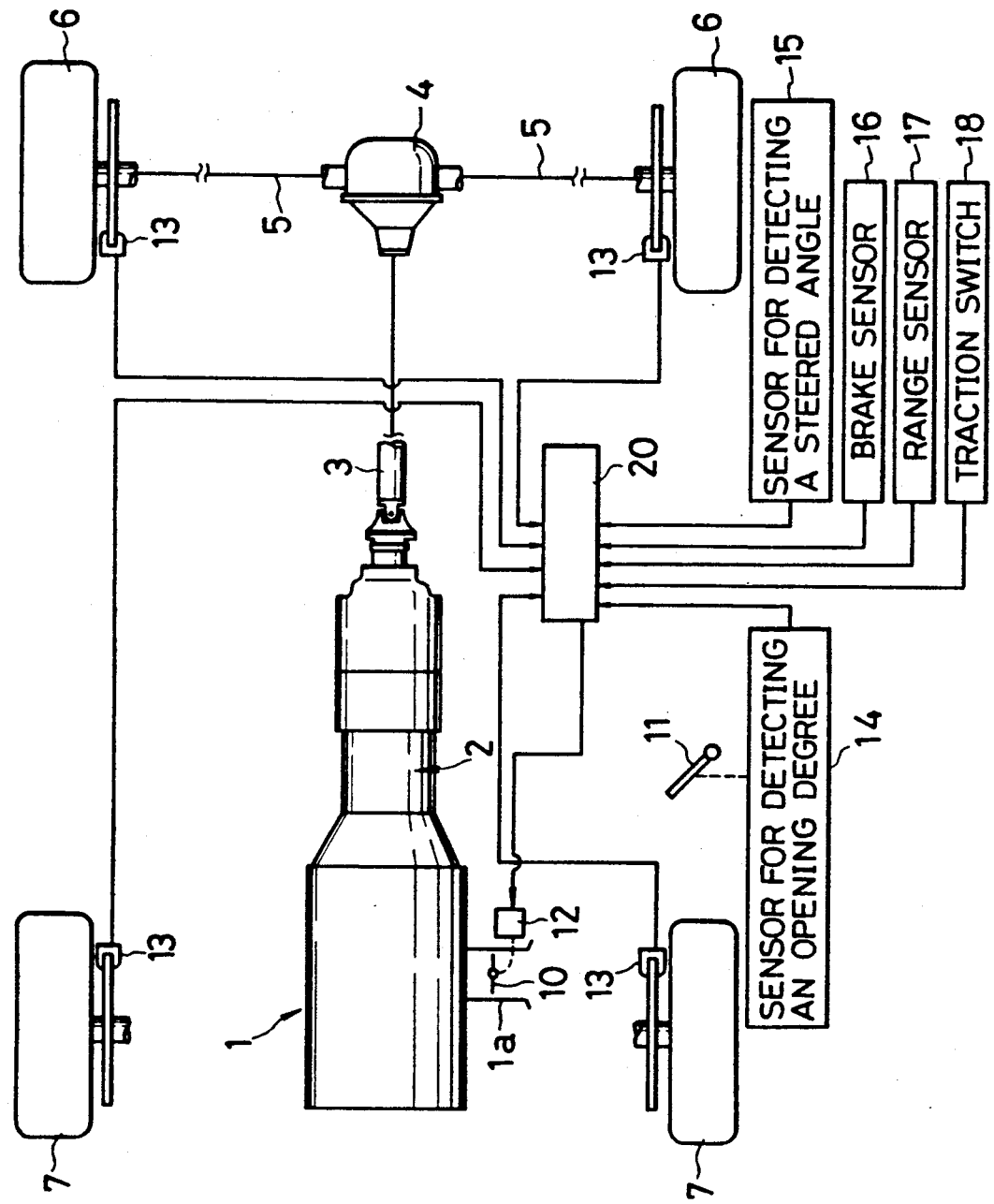
FIg. 2 is a diagram showing one example of the slip control apparatus according to the present invention.

As shown in FIG. 2, reference numeral 1 stands for an engine, and 2 for a automatic transmission having, for example, four forward shift ranges and one reverse range. An engine power shifted by the automatic transmission 2 is transmitted to left-hand and right-hand rear wheels 6 and 6 through a propeller shaft 3 disposed at a position rearward of the automatic transmission 2, a differential 4 and a rear wheel shaft 5. In this embodiment, there is shown an automobile of the type in which the rear wheels 6 and 6 are driven wheel and the left-hand and right-hand front wheels 7 and 7 are undriven wheels.

On an intake passage 1a of the engine 1 is mounted a throttle valve 10 as an output adjusting means for adjusting output from an engine by a control over an amount of intake air. The throttle valve 10 is electrically connected to an accelerator pedal 11 and a degree of opening, or an opening degree, of the throttle valve 10 is electrically controlled by means of a throttle actuator 12 constituted by a stepping motor or the like.

At positions nearby the front and rear wheels 6 and 7 is disposed each a wheel velocity sensor 13 for sensing a rotational velocity of the wheel. Furthermore, there are mounted a sensor 14 for sensing an opening degree of the accelerator pedal 11, a sensor 15 for sensing a steered angle of the wheel, a brake sensor 16 for sensing an amount in which a brake pedal is stepped down, a range sensor 17 for sensing a range position of the automatic transmission 2, and a traction switch 18 for manually selecting whether or not a slip control be required. A signal from each of the sensors 13 to 17 is input in a controller 20 comprising a microcomputer and the controller 20 controls the engine output by controlling an opening degree of the throttle valve 10, thus preventing a slip of the rear driven wheels 6.

The slip control by the controller 20 will be described more in detail with reference to FIGS. 3 to 6.

Figure 5:
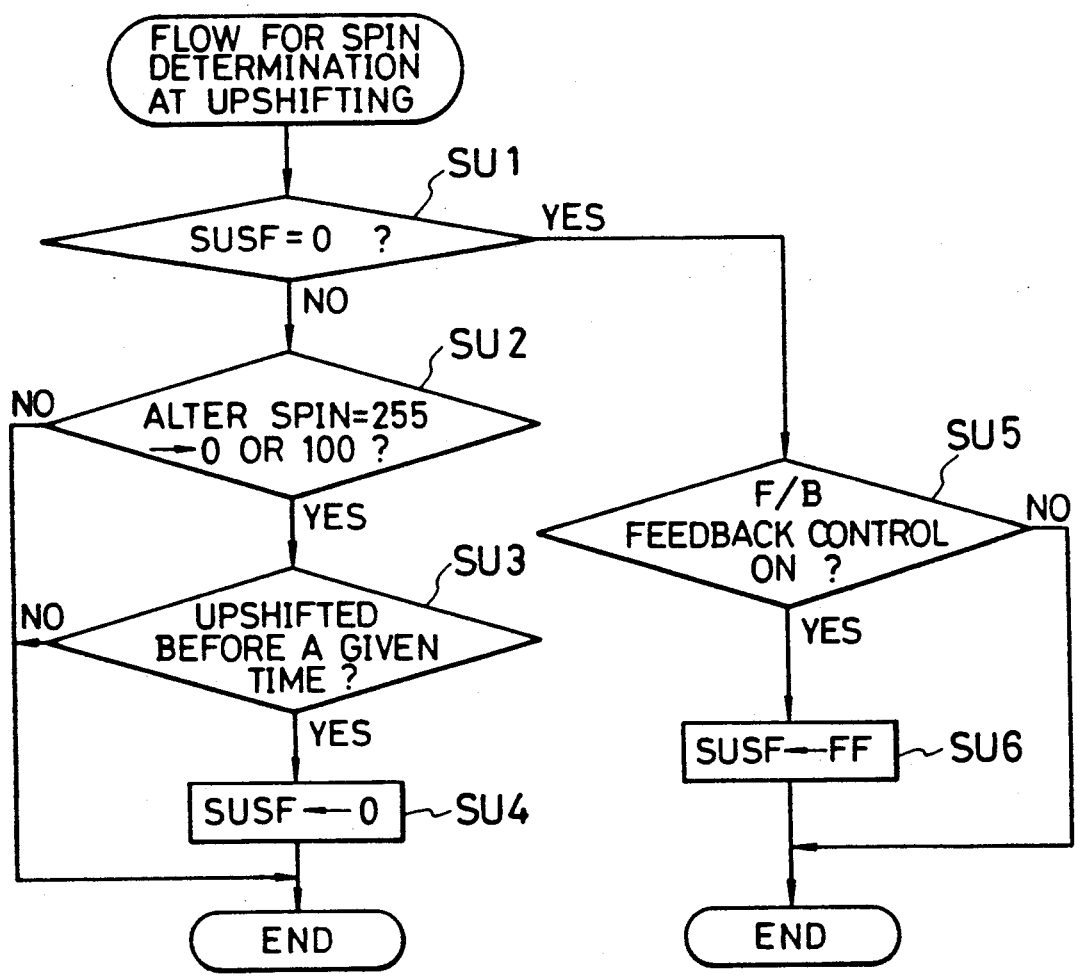

Referring first to FIG. 3, at step SM1, the system is initialized and, at step SM2, a shift control is carried out to set a speed stage of the automatic transmission 2 in accordance with a vehicle speed and an amount in which the accelerator pedal 11 is stepped down. Then at step SM3, it is determined as to whether or not a slip occurs at the time of upshifting the automatic transmission 2 on the basis of a flow chart as shown in FIG. 5. Furthermore at step SM4, a target opening degree NTAG of the throttle valve 10 is computed in accordance with the amount in which the accelerator pedal 11 is stepped down and, at step SM5, the slip control of the driven wheels 6 is then carried out on the basis of the slip control flow chart as shown in FIG. 6. This slip control is carried out basically by controlling an opening degree of the throttle valve 10 so as to become a control opening degree STAG. At the time of ordinary control that does not require slip control, an opening degree of the throttle valve 10 is controlled so as to reach a target opening degree NTAG in accordance with an amount in which the pedal is stepped down. Then the flow returns to step SM2 and this process is repeated.

Referring now to FIG. 4, a control flow will be described. The control flow chart starts as interruption is made into the main flow chart at every predetermined time. At step S11 various data such as a wheel velocity, an opening degree of the accelerator pedal, a steered angle and the like are input and the corresponding signals are processed. Then the flow proceeds to step S12 where, for example, decrement processing is executed for each of control timers. Then at step S13, the automatic transmission 2 starts shifting by turning on or off the solenoid valves in a given manner in order to provide a target speed stage. Thereafter, at step S114, the shifting terminates as an opening degree of the throttle valve 10 is actually controlled to reach the target opening degree NTAG or the control opening degree STAG.

The flow chart for determining a spin at the time of upshifting will be described hereinbelow with reference to FIG. 5. At step SU1, a value of a spin flag SUSF is determined. If a spin would be caused to occur upon the upshifting of the transmission, it is determined whether SUSF=0. If SUSF is not zero, on the one hand, at step SU2, whether or not a spin occurs is determined. This determination is made to see whether or not a spin flag SPIN changes from SPIN=255 to SPIN=0 or 100, as will be described hereinbelow. At the time where a spin occurs, the flow goes to step SU3 where it is determined whether or not the transmission 2 has been upshifted prior to a given time. If YES, the flag SUSF is set at SUSF=0 at step SU4 and the processing terminates.

If SUSF is zero at step SU1, on the other hand, it is determined at step SU5 whether or not the engine output is in the process of feed-back control. If NO at step SU5, in other words, if it is in the process of feed-forward control, a state of SUSF=0 is maintained. Only when the feed-forward control is transferred to the feed-back control, SUSF=FF is set again to its initial value and the processing terminates.

Figure 6A:
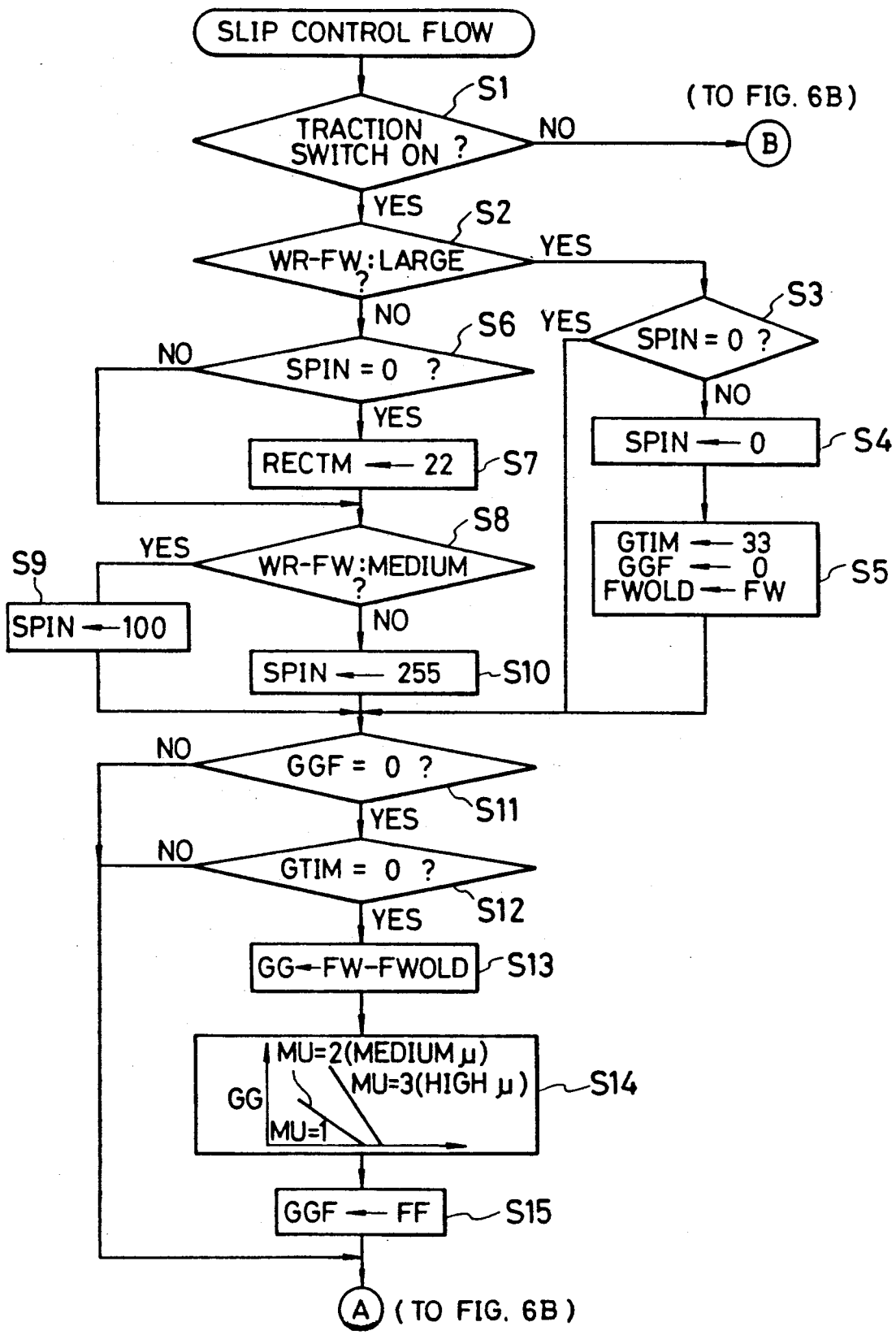
Figure 6B:
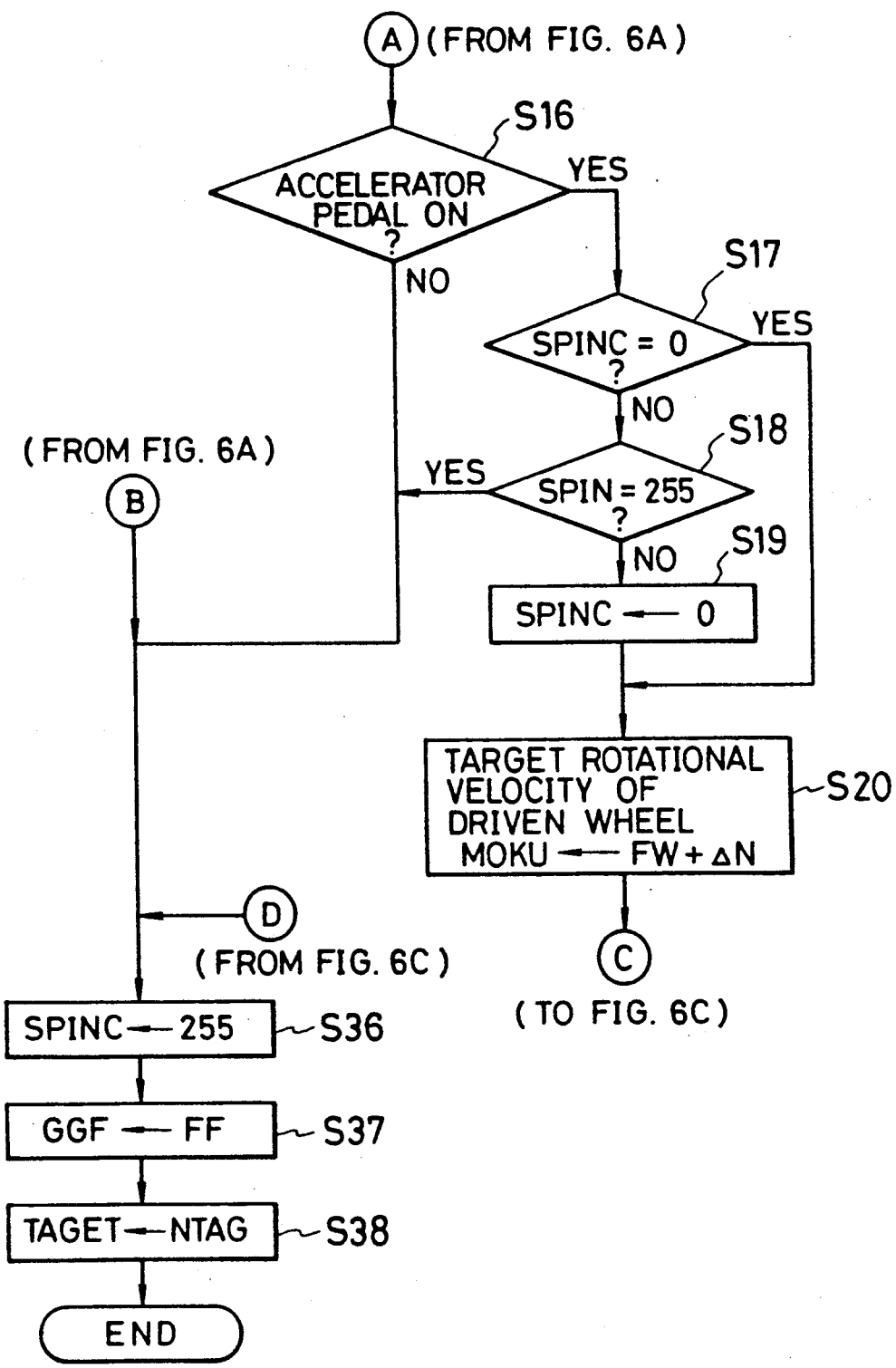

Referring now to FIGS. 6A to 6C, a slip control flow chart will be described. At step S1, whether or not the slip control is required is determined by checking whether or not the traction switch is turned on or off by a driver$\mu$s selection. When it is found from an ON state of the traction switch, in which it is turned on, that the slip control is required, the driven rear wheels 6 are subjected to the slip control by procedures at step S2 and thereafter. At the procedures from step S2 and thereafter, a degree of slip and a friction coefficient, $\mu$, on pavement are determined.

At step S2, a wheel velocity of the driven rear wheel, WR, is compared with a wheel velocity of the undriven front wheel, FW. It is to be noted herein that the wheel velocity of the driven rear wheel, WR, or the rear (driven) wheel velocity, is meant to be a velocity of the rear driven wheel that is larger than that of the other rear driven wheel and that the wheel velocity of the undriven front wheel, FW, or the front (undriven) wheel velocity, is meant to be a velocity obtained by averaging the wheel velocities of the left-hand and right-hand front undriven wheels.

If it is determined at step S2, on the one hand, that the comparison of the rear wheel velocity WR with the front wheel velocity FW produces a value larger than a given value (a first given value), the flow proceeds to step S3 where a value of the spin flag SPIN is determined. If SPIN≠0, it is decided that a large degree of spin occurs and then at step S4, the spin flag SPIN is set at SPIN=0. Further, at step S5, a timer, GTIM, for determining a friction coefficient on $\mu$ on pavement is initially set at a given value, for example, GTIM=33; a flag GGF for terminating the determination of the friction coefficient $\mu$ on pavement is initially set at GGF=0 (while the flag GGF is set at GGF=FF at the time of termination); and the current undriven wheel velocity FW is renewed to a previous undriven wheel velocity FWOLD. Then the flow proceeds to step S11.

If it is determined NO at step S2, i.e., if it is determined that the difference between the rear and front wheel velocities, WR−FW, is smaller than the first given value, on the other hand, the flow advances to step S6 where it is further determined what is a value of the spin flag SPIN. As long as a large degree of spin is indicated by SPIN=0, a timer, RECTM, for measuring a given time is set to an initial value (for example, RECTM=22) at step S7 and the flow goes to step S8. If the spin flag SPIN is not SPIN=0 at step S6, the flow proceeds directly to step S8. Then at step S8, it is then determined whether o not the difference (WR−FW) is to a middle extent, i.e., whether or not it is equal to or larger than a second given value that is smaller than the first given value. If YES at step S8, the spin flag SPIN is set to SPIN=100 at step S9 while if NO at step S8, or if the difference (WR−FW) is smaller than the second given value, the spin flag SPIN is set to SPIN=255.

Thereafter, at step S11 and steps which follow, the friction coefficient $\mu$ on pavement is determined. As long as the flag GGF is GGF=0 at step S11. i.e., before the friction coefficient $\mu$ is determined, the flow goes to step S12 where a value of the timer GTIM is determined. As a given time has elapsed to reach GTIM=0 from the time when a large degree of slip occurred, an acceleration GG (=FW−FWOLD) of the undriven wheel is given from the difference between the undriven wheel velocity FW at this time and the undriven wheel velocity FWOLD at the previous time when the large degree of slip had occurred. Then at step S14, the friction coefficient $\mu$ on pavement is given from a map stored in a ROM of the controller 20 as shown in step S14 on the basis the current undriven wheel velocity FW and the acceleration GG of the undriven wheel. It is to be understood from the map that, in the case of the same undriven wheel velocity FW, the higher the acceleration GG of the undriven wheel the higher the friction coefficient $\mu$. Thus at step S14, it is noted that the friction coefficient $\mu$ is lower in a range MU=1, median in a range MU=2, and higher in a range MU=3. After the determination of the friction coefficient $\mu$, the flag GGF is set at GGF=FF (for the termination of determination of the friction coefficient $\mu$) and the flow then proceeds with a slip control at step S16 and steps which follow.

At step S16, it is determined whether or not the accelerator pedal 11 is stepped down and the slip control is executed as long as the pedal 11 is in an ON state in which it is stepped down. Then at step S17, it is determined what is a value of a flag SPINC. It is to be noted that the value of the flag SPINC is 0 during the slip control. When SPINC≠0, i.e., when the slip control is about to start, the flow proceeds to step S18 where a value of the spin flag SPIN is determined. If SPIN=255 at step S18, i.e., if it is determined that a spin is in such as state that it converges, the flow proceeds to step S36 in order to set an opening degree of the throttle value to a value corresponding to an amount in which the accelerator pedal 11 is stepped down.

IF SPIN≠255 at step S18, the flag SPINC is set to SPINC=0 at step S19 and a target rotational velocity MOKU of the driven wheel is previously set to MOKU=FW+$\Delta$N at step S20 (in which $\Delta$N is a given value so as to make a difference between revolutions of the front and rear wheels correspond to the friction coefficient $\mu$ in the feed-back control of the rotational velocities of the driven wheels).

Thereafter, at steps S21 and S22, it is determined what are values of the spin flag SPIN and the timer RECTM after the large degree of spin has been converged, respectively. If SPIN=0 at step S21, i.e, if it is determined that the large degree of slip occurred, the flow proceeds to step S23 where the opening degree of the throttle valve 10 is subjected to feed-forward control to amount to a set limit value. The set limit value of the opening degree of the throttle valve 10 is variably set on the basis of the flow as shown in FIG. 7.

Figure 7:
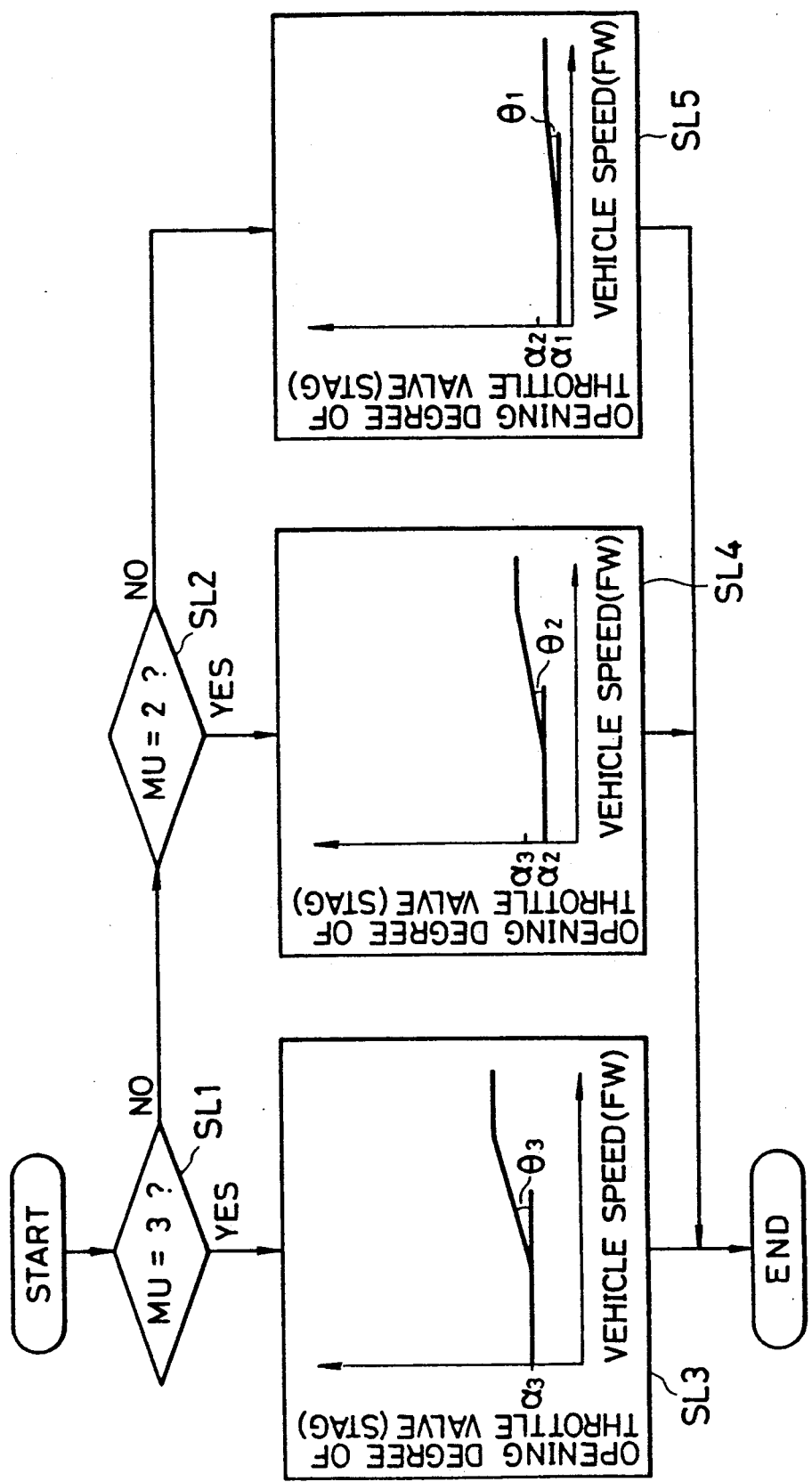

More specifically, as shown in FIG. 7, a degree of a presumed friction coefficient $\mu$ on pavement during running is determined at steps SL1 and SL2. In accordance with the presumed friction coefficients $\mu$, set limits values STAG based on the rotational velocity FW of the undriven wheel are given from a map stored in a ROM in the controller 20 as shown in steps SL3, SL4, and SL5, respectively.

Each of the maps as shown in SL3 to SL5 is set such that opening degrees of the throttle valve becomes larger as the rotational velocity of the undriven wheel, FW, i.e., vehicle speed, gets faster. It is also noted that the maps are set in such a manner that the set limit value STAG (reference value $\alpha$3) in the high $\mu$ area MU=3 is the highest, the set limit value STAG (reference value $\alpha$2) in the intermediate $\mu$ area MU=2 is lower than the set limit value STAG in the area MU=3 yet higher than the STAG in the area MU=1, and the set limit value STAG (reference value α1) in the low μ area MU=1 is the lowest, namely, that the reference values are set so as to satisfy the relationship as follows: α3>α2>α1. It is further to be noted that changes in opening degrees of the throttle valve with respect to an increase in vehicle speeds are set so as to be the largest in the high μ area MU=3 while they are set so as to be the lowest in the low μ area MU=1. In other words, an inclination of characteristics lines in the maps as shown in steps SL3 to SL5 is set so as to satisfy the relationship as follows: θ3>θ2>θ1. This is based on the fact that acceleration should be ensured in the high μ area MU=3 while the vehicle speed has little to do with the opening degree of the throttle valve in the low μ area MU=1. Furthermore, it is noted that each of the maps is provided in its low-speed and high-speed ranges with an area where the set limit value is set constant and in its intermediate-speed range with an area where the set limit value varies with vehicle speeds.

Thus, in order to alter the set limit value STAG determined form the map as shown in FIG. 7 at the time when a large degree of spin occurs on account of the upshifting of the transmission 2, a value of the upshifting flag SUSF is determined at Step S24 and, only when the flag is SUSF=0, i.e., when it is determined that a large degree of spin occurs, the set limit value STAG is multiplied by a predetermined value (by 1.2 times) and the opening degree of the throttle valve is corrected toward a larger opening degree thereof.

Figure 8:
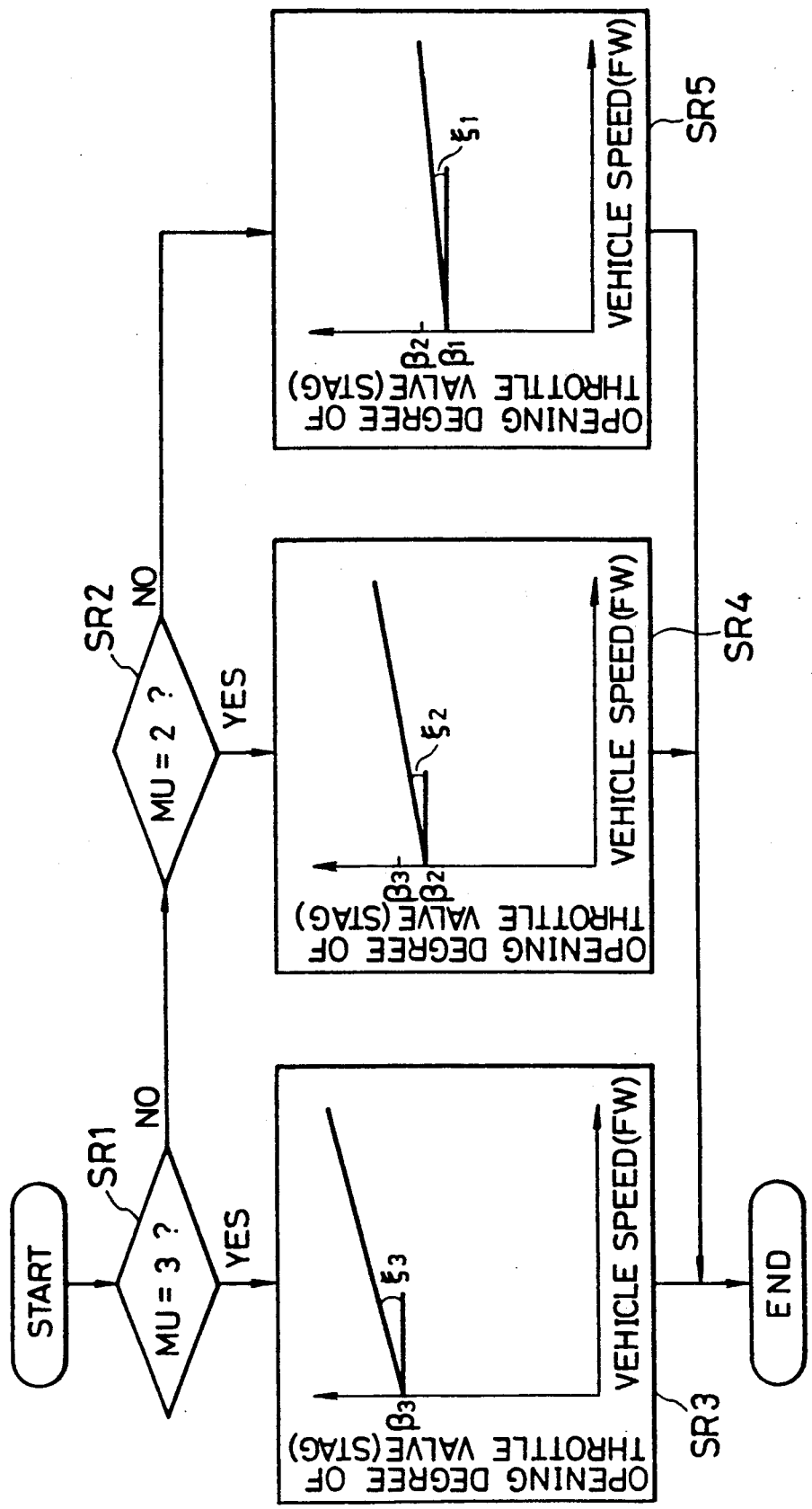

At step S21 in the control flow chart as shown in FIG. 6C, as a large degree of spin is reduced to some extent, namely, SPIN≠0, the flow proceeds to step S22 where it is determined whether or not a given period of time has elapsed. If RECTM≠0, namely, if such a given period of time has not yet passed by, the feed-forward control is executed at step S26 to determine a target set return value STAG in accordance with the rotational velocity FW of the undriven wheel or the vehicle speed on the basis of the flow chart from step SR1 to SR5 in FIG. 8 in order to return the opening degree of the throttle valve to the set feed-forward limit value STAG in a short period of time. The set return value STAG is calibrated in substantially the same manner as the set limit value STAG in FIG. 7. In other words, each of the maps as shown in FIG. 8 (which is stored in a ROM in the controller 20) is set in such a manner that the opening degrees of the throttle valve becomes larger as vehicle speeds get faster and that the set return value STAG (reference value β3) in the high μ area MU=3 is the highest, the set return value STAG (reference value β2) in the intermediate μ area MU=2 is lower than the set return value STAG in the area MU=3 yet higher than the STAG in the area MU=1, and the set return value STAG (reference value β1) in the low μ area MU=1 is the lowest, namely, that the reference values are set so as to satisfy the relationship as follows: β3>β2>β1. It is further to be noted that changes in opening degrees of the throttle valve with respect to an increase in vehicle speeds are set so as to be the largest in the high μ area MU=3 while they are set so as to be the lowest in the low μ area MU=1. In other words, characteristics lines in the maps as shown in steps SR3 to SR5 are inclined so as to be set so as to satisfy the relationship as follows: ξ3>ξ2>ξ1.

Thereafter, the set return value STAG determined from the maps as shown in FIG. 8 is altered at the time when a spin occurs on account of the upshifting of the transmission 2. At step S27, a value of the upshifting flag SUSF is determined. Only when it is determined at step S27 that a large degree of spin occurs at the time when the transmission 2 is upshifted, namely, only when SUSF=0, the set return value is multiplied by a given value (by 1.2 times) at step S28 in order to correct an opening degree of the throttle valve toward a larger opening degree thereof.

Thus, if SPIN≠0 at step S21 and RECTM=0 at step S22, the flow proceeds to step S29 where the feed-back control (for example, in PI-PD system) is executed to set a target opening degree STAG1 so as to reach a target rotational velocity MOKU of the drive wheel. In this case, there is the opportunity that the target opening degree STAG1 becomes closer to a full closed state. However, this impairs acceleration after convergence of a spin so that the minimum value of the target opening degree STAG1 is restricted to a remitter value. In other words, at step S30, the remitter value STAG2 is determined from the rotational velocity FW of the undriven wheel on the basis of the map in the same manner as at step S23. Then at step S31, the remitter value STAG 2 is compared with the target opening degree STAG1 determined by the feed-back control and a larger value is given at steps S32 and S33, however, it is restricted to the remitter value STAG2 even if it is the smallest value.

Thus, at step S34, a target opening degree STAG at the slip control is compared with a target opening degree NTAG in accordance with an amount in which the accelerator pedal is stepped down. If STAG≦NTAG, on the one hand, it means that a slip control is required so that the flow proceeds to step S35 where an opening degree TAGET to be actually controlled at step S35 is renewed to the target opening degree STAG determined by the slip control. Then the system concludes.

If STAG>NTAG at step S34, the flow goes to step S36 in FIG. 6B where the flag SPINC is set to SPINC=255 (meaning that no slip control is required) in order to regulate an opening degree of the throttle value in accordance with the accelerator pedal during ordinary running. Then at step S37, the flag GGF is set at GGF=FF as the determination of the friction coefficient μ has been finished and, at step S38, the opening degree TAGET to be actually controlled at step S38 is controlled as a target opening degree NTAG in accordance with an amount in which the accelerator pedal is stepped down. The system then concludes.

In the above-mentioned embodiments, a slip detecting means comprises four of vehicle speed sensors, generally referred to as 13, disposed so as to sense a slip at the driven wheels 6 in accordance with steps S2 to S8 in the control flow chart as shown in FIG. 6. Further, a reduction control means is constituted in such a manner that an opening degree of the throttle valve 10 as an output adjusting means is subjected to feed-forward control to become a set limit value STAG as shown in FIG. 9(a) so as to reduce an engine output to a set limit value at the time when a slip is detected by the slip detecting means at step S23 in the control flow chart as shown in FIG. 6.

Figures 9A, 9B, 9C, 10:
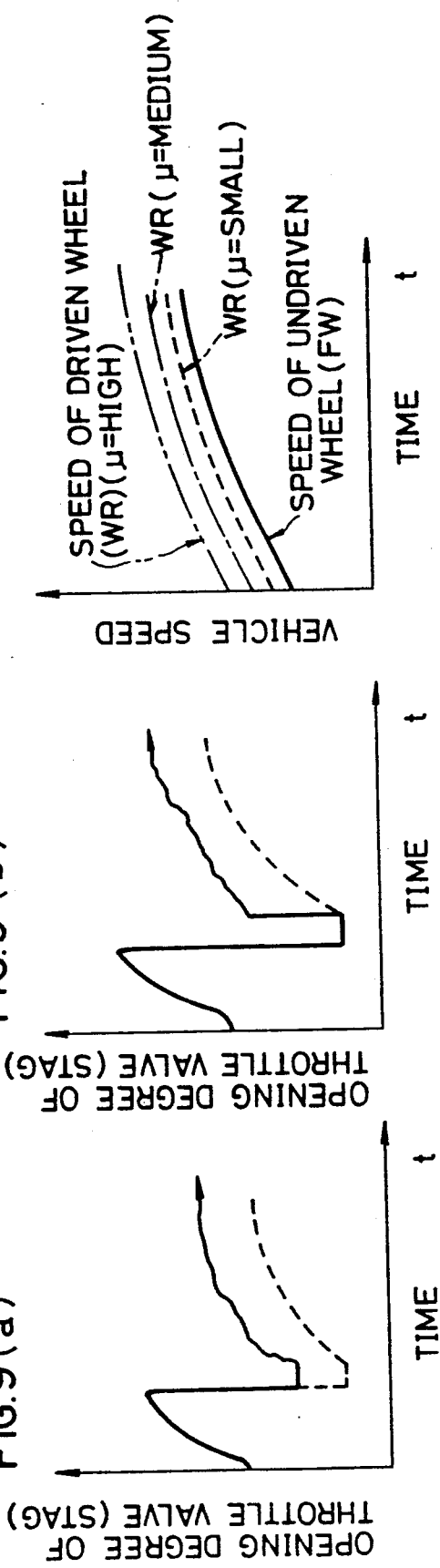
FIGS. 9(a), (b), and (c) each is a graph showing a control over output of the engine by a reduction control and a return control by means of the feed-forward control as well as over the opening degree of the throttle valve by means of the feed-back control, respectively.
FIG. 10 is a graph showing a state of changes in rotational velocities of the driven and undriven wheels during occurrence of a large degree of slip.
Figure 11:
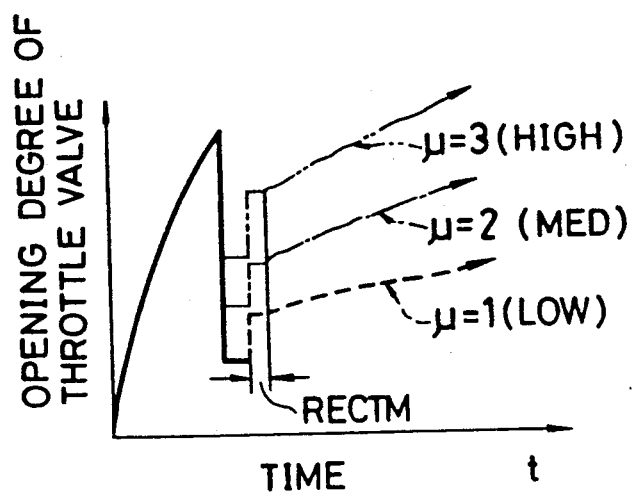
FIG. 11 is a graph showing a state of changes in opening degrees of the throttle valve during occurrence of a large degree of slip.
Figure 12:
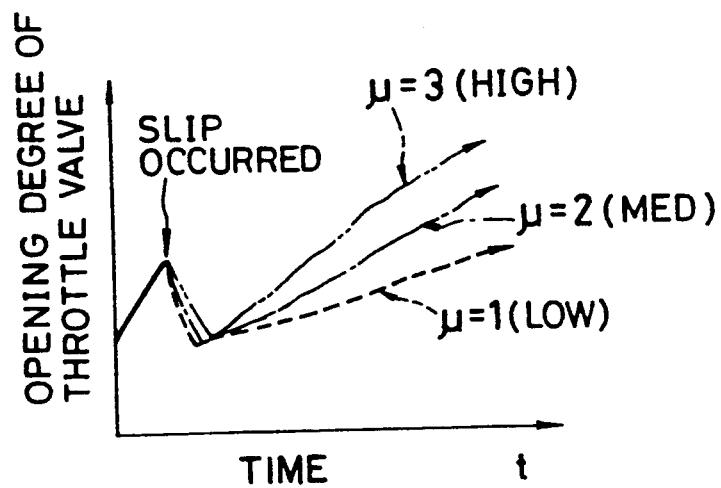
FIG. 12 is a graph showing a state of changes in opening degrees of the throttle valve during occurrence of a small degree of slip.

It is to be noted that a return control means is constituted such that an opening degree of the throttle valve 10 is increased up to a return opening degree STAG from the set limit value as shown in FIG. 9(b) so as to return an engine output reduced by the reduction control means on the basis of a control over the opening degree of the throttle valve after the spin flag SPIN has become SPINΩ0 from the engine output is controlled to be reduced by the reduction control means at steps S22 and S23 in FIG. 6C. It is also to be noted that the maps as shown in FIGS. 7 and 8 are constructed, respectively, such that the set limit values of the reduction control means and the set return values of the return control means are set in advance as the set limit values STAG of the corresponding opening degrees of the throttle valve 10 and the set return values STAG of the return control means in accordance with friction coefficient $\mu$ on pavement and vehicle speeds.

The spin detecting means is further constituted so as to detect a degree of slip of the driven wheel at step SU2 as shown in FIG. 5, and a shift-up detecting means is constituted so as to detect the up-shifting of the automatic transmission 2 at step SU3 as shown in FIG. 5. A correction means is constituted such that, at step SU4 in FIG. 5 and at steps S24, S25, S27, and S28, in response to outputs from the shift-up detecting means and the slip detecting means, the set limit values STAG and the set return values STAG of the opening degrees of the throttle valve are corrected toward a larger opening degree as well as the set limit values of the reduction control means and the set return values of the return control means are corrected toward the side on which engine output becomes larger at the time when a slip occurs at the driven wheel on account of the up-shifting of the transmission 2.

It is thus to be noted that, in the above embodiments, the feed-forward control of the throttle valve 10 is executed in order by the reduction control means and the return control means prior to the feed-back control of the throttle valve 10 at the time when a large degree of slip occurs. As a large degree of slip occurs, it is found that there is a large difference between the rotational velocities of the driven and undriven wheels (GW-FW) as shown in FIG. 10. At this time, an opening degree of the throttle valve 10 is first controlled by the reduction control means, thereby resulting in a rapid reduction to a target set limit value STAG in accordance with the rotational velocity of the undriven front wheel, FW. This control permits a reduction of the engine output to a great extent in a very short time, thus immediately reducing the rotational velocity of the driven wheel 6 and thereby facilitating a convergence of slip. Thereafter, the opening degree of the throttle valve 10 is controlled by the return control means, thereby resulting in a rapid return to a target set return value STAG in accordance with the rotational velocity of the undriven wheel, FW. This increases outputs from the engine and rapidly returning the rotational velocity of the driven wheel 6, GW, to a speed closer to or nearby the target rotational velocity MOKU. This control is set to keep this state for a given time RECTM, thus providing a favorable return responsiveness and acceleration.

As the opening degree of the throttle valve 10 is then subjected to feed-back control in a usual manner, the rotational velocity GW of the driven wheel 6 is conveniently converged to a target rotational velocity MOKU away in a given velocity from the rotational velocity FW of the undriven wheel, as shown in FIG. 9(c). Thus a slip is effectively prevented.

It is to be noted that, as the set limit value STAG for subjecting the opening degree of the throttle valve to feed-forward control by the reduction control means and the set return value STAG by the return control means are set in accordance with the vehicle speed and the friction coefficient $\mu$ on pavement as shown in FIGS. 7 and 8, respectively, the output from the engine is reduced to a large extent by adjusting the opening degree of the throttle valve to an almost fully closed degree. thus effectively regulating and preventing occurrence of a slip.

As a slip temporarily occurs on account of the up-shifting of the transmission 2, it may be converged immediately after an energy of inertia of the engine 1 has been discharged. When the engine output is reduced to a large extent in a usual manner, deceleration is usually felt. However, in this embodiment, when such a slip occurs, both of the set limit value STAG of the reduction control means and the set return value STAG of the return control means are corrected to a large extent toward a larger opening degree of the throttle valve by the correction means, thus reducing the engine output to a smaller extent. This permits an effective control over and prevention of a slip at the driven wheel while causing no feeling of deceleration.

In the above embodiments, as a slip occurs on account of the up-shifting of the transmission 2, both the set limit value STAG and the set return value STAG of the opening degree of the throttle valve by means of the feed-forward control may be corrected toward a larger opening degree. It is to be noted, however, that at least the set limit value STAG is conveniently corrected from the relation with a time required for discharging the energy of inertia from the engine at the time of up-shifting.

The present invention may be embodied in other specific forms without departing from the spirit and scope thereof. The present embodiments as have been described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A slip control apparatus comprising:
   output adjusting means for adjusting output from an engine;
   slip detecting means for detecting a slip value of a driven wheel on pavement;
   reduction control means for subjecting said output adjusting means to a feed-forward control to reduce the output from the engine to a set limit value when the slip value detected by said slip detecting means is equal to or larger than a given value;
   means for detecting a friction coefficient on pavement;
   means for detecting a vehicle speed; and
   return control means for subjecting said output adjusting means to said feed-forward control to return the output from the engine reduced by said reduction control means to a set return value in a given period of time after the output has been reduced by said reduction control means;
   wherein said set limit value and said set return value are set in advance at least in accordance with the friction coefficient on pavement detected by said means for detecting a friction coefficient and the vehicle speed detected by said means for detecting a vehicle speed.

2. A slip control apparatus as claimed in claim 1, wherein each of said set limit value and said set return value is set at a plurality of values in accordance with a friction coefficient on pavement.

3. A slip control apparatus as claimed in claim 2, wherein said set limit value and said set return value are set so as to become larger as the friction coefficient gets larger.

4. A slip control apparatus as claimed in claim 1, further comprising:
a memory means for storing plural kinds of maps corresponding to the friction coefficient on pavement, each indicating a relationship of said set limit value with a vehicle speed; and
a map selecting means for selecting a map corresponding to the friction coefficient on pavement from said plural kinds of maps;
wherein said set limit value is determined to be used for said reduction control means by collating the map selected by said map selecting means with the vehicle speed.

5. A slip control apparatus as claimed in claim 4, wherein the set limit value in each of the maps is set so as to become larger as the friction coefficient gets larger.

6. A slip control apparatus as claimed in claim 5, wherein each of the maps is provided with a first range in which the set limit value becomes larger in proportion to an increase of the vehicle speed and with a second range in which the set limit value is made constant regardless a change of the vehicle speed;
wherein, in said first range, a ratio of an amount of the set limit value increased to an amount of the vehicle amount increased becomes larger as the friction coefficient becomes larger.

7. A slip control apparatus as claimed in claim 1, wherein:
said engine is an engine of Otto type in which the output therefrom is changed by adjusting an amount of intake air; and
said output adjusting means is a throttle valve for adjusting the amount of intake air;
in which said set limit value is set as an opening degree of the throttle valve.

8. A slip control apparatus as claimed in claim 7, further comprising:
a memory means for storing plural kinds of maps corresponding to the friction coefficient on pavement, each indicating a relationship of an opening degree of the throttle valve as said set limit value with a vehicle speed; and
a map selecting means for selecting a map corresponding to the friction coefficient on pavement from said plural kinds of maps;
wherein said set limit value is determined to be used for said reduction control means by collating the map selected by said map selecting means with the vehicle speed.

9. A slip control apparatus as claimed in claim 8, wherein the opening degree of the throttle valve as the set limit value in each of the maps is set so as to become larger as the friction coefficient gets larger.

10. A slip control apparatus as claimed in claim 9, wherein each of the maps is provided with a first range in which the set limit value becomes larger in proportion to an increase of the vehicle speed and with a second range in which the set limit value is made constant regardless of a change of the vehicle speed;
wherein, in said first range, a ratio of an amount of the set limit value increased to an amount of the vehicle speed increased becomes larger as the friction coefficient becomes larger.

11. A slip control apparatus as claimed in claim 1, further comprising:
a memory means for storing plural kinds of maps corresponding to the friction coefficient, each indicating a relationship of said set return value with a vehicle speed; and
a map selecting means for selecting a map corresponding to a friction coefficient from said plural kinds of maps;
wherein said set return value is determined to be used for said return control means by collating the map selected by said map selecting means with the vehicle speed.

12. A slip control apparatus as claimed in claim 11, wherein the set return value in each of the maps is set so as to become larger as the friction coefficient gets larger.

13. A slip control apparatus as claimed in claim 1, wherein:
said engine is an engine of Otto type in which the output therefrom is changed by adjusting an amount of intake air; and
said output adjusting means is a throttle valve for adjusting the amount of intake air;
wherein said set return value is set as an opening degree of the throttle valve.

14. A slip control apparatus as claimed in claim 13, further comprising:
a memory means for storing plural kinds of maps corresponding to the friction coefficient on pavement, each indicating a relationship of an opening degree of the throttle valve as said set return value with a vehicle speed; and
a map selecting means for selecting a map corresponding to the friction coefficient from said plural kinds of maps;
wherein said set return value is determined to be used for said return control means by collating the map selected by said map selecting means with the vehicle speed.

15. A slip control apparatus as claimed in claim 14, wherein the opening degree of the throttle valve as the set return value in each of the maps is set so as to become larger as the friction coefficient gets larger.

16. A slip control apparatus as claimed in claim 1, wherein the slip value detected by said slip detecting means is set as a value obtained by subtracting an average value of rotational velocities of left-hand and right-hand undriven wheels from a rotational velocity of a driven wheel larger than that of the driven wheel.

17. A slip control apparatus as claimed in claim 1, further comprising:
a transmission interposed between the engine and driven wheels;
a shift-up detecting means for detecting the upshifting of the transmission; and
a correction means for correcting at least the set limit value in a direction in which the output from the engine increases in response to the output from said slip detecting means and said shift-up detecting means when a slip occurs on account of the upshifting of the transmission.

18. A slip control apparatus as claimed in claim 1, further comprising:
a feed-back control means for subjecting said output adjusting means to feed-back control so as to change a degree of slip of the driven wheel to a given target value; and a control switching means for switching a control means from said reduction control means, said return control means and said feed-back control means in accordance with a magnitude of the slip value detected by said slip detecting means.

19. A slip control apparatus as claimed in claim 18, wherein:

said control switching means is set so as to execute a control means in the order of said reduction control means, return control means and feed-back control means when the slip value detected by said slip detecting means is equal to or larger than said given target value; and wherein said control switching means is set so as to execute a control by means of said feed-back control means, without using said reduction control means and said return control means, when the slip value detected thereby is lower than said given target value.

20. A slip control apparatus, comprising:

output adjusting means for adjusting output from an engine;

slip detecting means for detecting a slip value of a driven wheel on pavement;

vehicle speed detecting means for detecting a vehicle speed;

friction coefficient detecting means for detecting a friction coefficient on pavement;

set limit value determining means for determining a set limit value of the output from the engine in accordance with the vehicle speed and the friction coefficient and in response to output from said vehicle speed detecting means and said friction coefficient detecting means;

set return value determining means for determining a set return value of the output from the engine, larger than said set limit value, in accordance with the vehicle speed and the friction coefficient and in response to output from said vehicle speed detecting means and said friction coefficient detecting means;

reduction control means for subjecting said output adjusting means to a feed-forward control to reduce the output from the engine to the set limit value determined by said set limit value determining means when the slip value detected by said slip detecting means is equal to or larger than a given value;

return control means for subjecting said output adjusting means to said feed-forward control for a given period of time to return the output from the engine to a set return value determined by said set return value determining means when said slip value becomes smaller than said given value by control by means of said reduction control means; and feed-back control means for subjecting sad output adjusting means to feed-back control so as to turn the slip value detected by said slip detecting means to a target value after control by means of said return control means.

21. A slip control apparatus as claimed in claim 20, wherein sad friction coefficient detecting means comprises:

a first rotational velocity detecting means for detecting a rotational velocity of an undriven wheel at the time when a slip occurs to a degree equal to or larger than said given value;

a second rotational velocity detecting means for detecting a rotational velocity of the undriven wheel in a given period of time after the time when the slip to a degree equal to or larger than said given value has occurred; and a friction coefficient determining means for determining a friction coefficient on pavement on the basis of a deviation between said first and second rotational velocity detecting means.

22. A slip control apparatus, comprising:

output adjusting means for adjusting output form an engine;

slip detecting means for detecting a slip value of a driven wheel on pavement;

vehicle speed detecting means for detecting a vehicle speed;

friction coefficient detecting means for detecting a friction coefficient on pavement;

set limit value of the output form the engine in accordance with the vehicle speed and the friction coefficient, in response to output form said vehicle speed detecting means and said friction coefficient detecting means;

set return value determining means for determining a set return value of the output from the engine, larger than said set limit value, in accordance with the vehicle speed and the friction coefficient, in response to output from said vehicle speed detecting means and said friction coefficient detecting means;

reduction control means for subjecting said output adjusting means to a feed-forward control to reduce the output from the engine to the set limit value determined by said set limit value determining means;

return control means for subjecting said output adjusting means to said feed-forward control or a given period of time to return the output from the engine to a set return value determined by said set return value determining means;

feed-back control means for subjecting said output adjusting to feed-back control to turn the slip value detected by said slip detecting means to a target value; and control switching means for switching control in the order of said reduction control means, return control means and feed-back control means when the slip value detected by said slip detecting means becomes equal to or larger than a first given value, and for executing control by means of said feed-back control means, without using said reduction control means and said return control means, when the slip value detected thereby becomes lower than said first given value yet equal to or larger than a second given value smaller than said first given value.

* * * * *